United States Patent Office 3,475,214
Patented Oct. 28, 1969

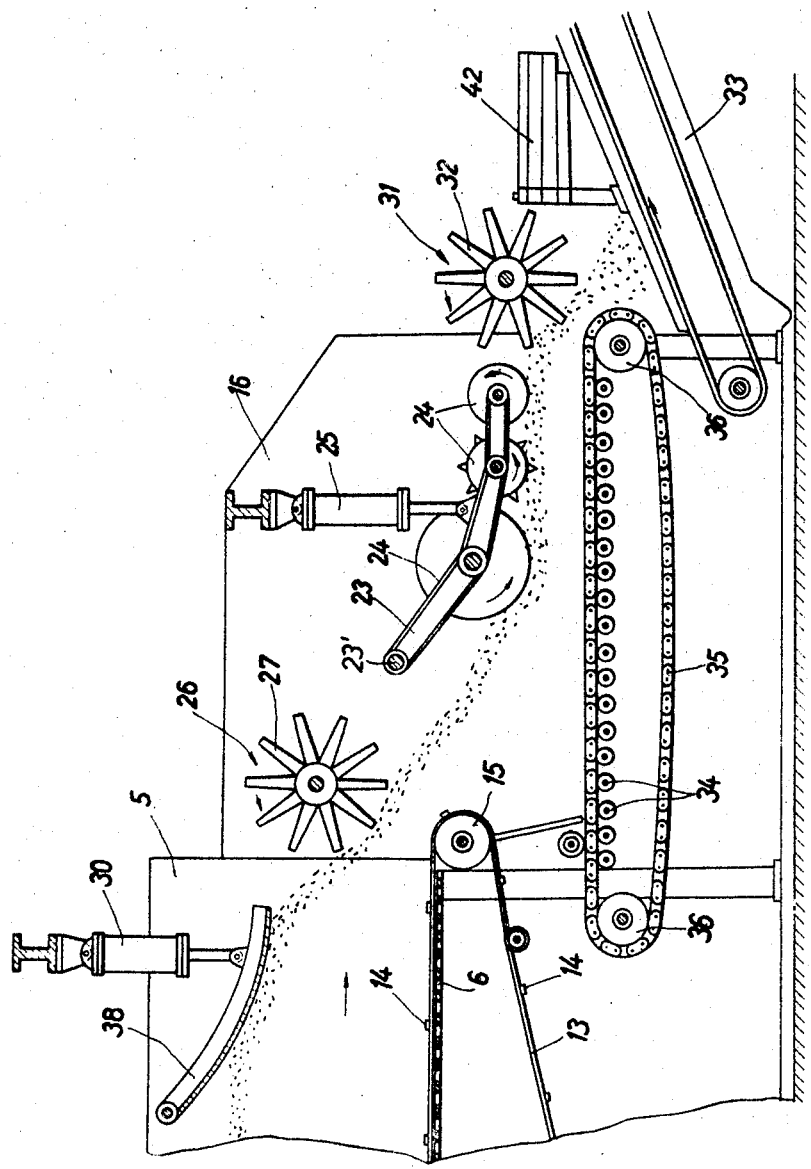

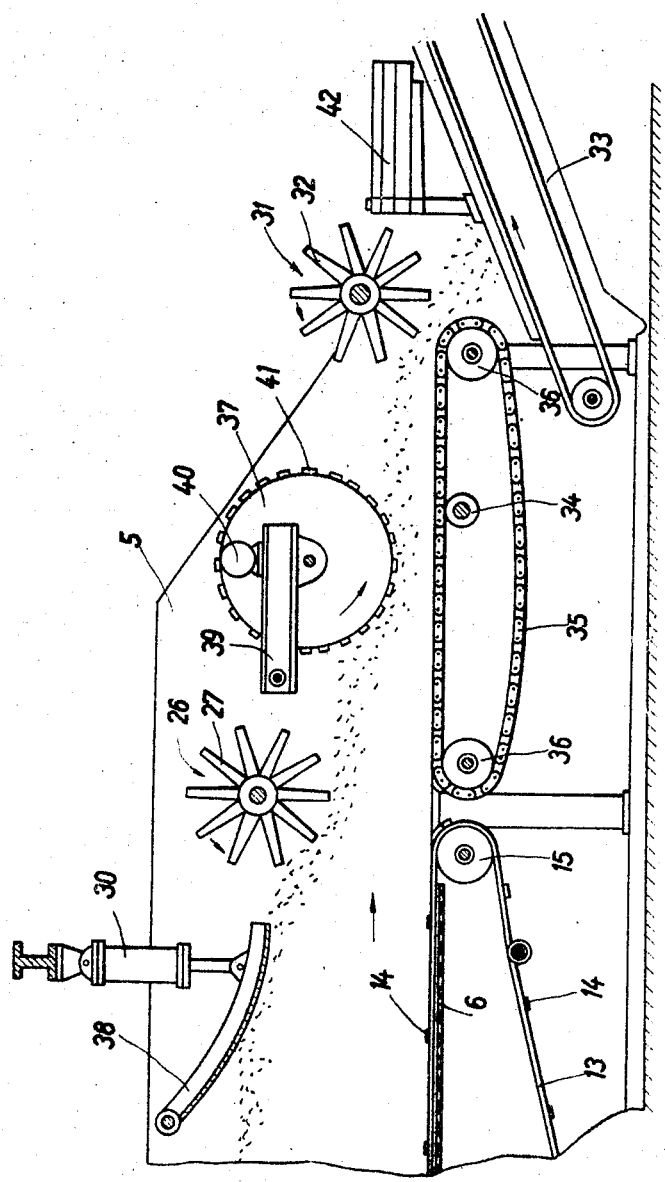

3,475,214
METHOD OF AND APPARATUS FOR REDUCING THE MOISTURE AND RESIDUAL SUGAR CONTENT OF A BAGASSE PASSING THROUGH A DIFFUSER
Willy Kaether, Braunschweig-Melverode, and Walter Dietzel, Braunschweig, Germany, assignors to Braunschweigische Maschinenbauanstalt, Braunschweig, Germany
Filed Oct. 14, 1966, Ser. No. 586,729
Claims priority, application Germany, Mar. 25, 1966, B 86,377
Int. Cl. C13d 1/00, 1/12
U.S. Cl. 127—5       10 Claims

ABSTRACT OF THE DISCLOSURE

Method of reducing the moisture and residual sugar content of sugar cane includes passing the sugar cane through a diffuser at a given rate of speed in a given direction, washing the sugar cane in an extraction zone of the diffuser with a spray of liquid conducted, from an accumulation thereof beneath the extraction zone, for a given distance in a direction counter to the direction in which the sugar cane is being passed through the extraction zone of the diffuser so as to extract sugar content from the sugar cane, and passing the sugar cane from which the sugar has been extracted through a preliminary pressure zone at a speed greater than the given rate of speed and subjecting it therein to further diffusion and compression prior to passing it for subsequent treatment through a liquid separating mill; and apparatus for carrying out the foregoing method.

---

The invention relates to a method of and apparatus for reducing the moisture and residual sugar content of sugar cane passing through a diffuser and then entering water separation mills, the sugar content of which is washed out on the countercurrent principle in the extraction zone of the diffuser by sprinkling with extraction liquid.

In known extraction methods the comminuted sugar cane passes from a charging hopper on to the screening surface of a diffuser, which may be equipped with a stationary screen and an endless conveyor for moving material over the screen or with a moving or rotating screen belt. On the underside of the screen is disposed a number of juxtaposed tanks, in which the extraction liquid, which is trickle fed from overhead sprays on to the layer of cane, is collected after passing through the bed. The extraction liquid is retrieved by means of circulating pumps associated with each tank and returned to the liquor spray distributors above the material bed and which, with reference to the direction of movement of the material, are disposed upstream of the supply tank.

At the outlet end of the diffuser the sugar cane mass, i.e., bagasse is sprayed with clean water or with the extraction liquor from the water separation mills and which, on passage through the bagasse layer, becomes enriched wtih sugar, this liquid accumulating in the tank next to the outlet end of the trough. This sugar enriched liquor is removed from the tank by a circulation pump and fed to a liquor distributor upstream of the tank in the direction of transport. This arrangement enables the extraction liquid to be passed cyclically in countercurrent from tank to tank, or from liquor distributor to liquor distributor, through successive sections of the bagasse layer. In its passage from the outlet end to the inlet or charging end of the diffuser, the extraction liquor is increasingly enriched with sugar, reaching its maximum concentration at the charging end.

The treated sugar cane, i.e., the bagasse on discharge from the diffuser is fed—its residual moisture content being about 80%—to water separation mills having, e.g., three water separation rolls, wherein the residual moisture is reduced to an extent which enables the bagasse to be used for firing purposes.

To operate water separation mills of this type, it requires very high power output of the order of 1200 HP or higher, since they work at pressures of 400 kg. per square cm. or higher which are necessary to reduce the moisture content of the bagasse to about 48–52%. The high pressures, at which the water separation mills operate, are explained by the fact that the bagasse only remains under pressure in the nip between the rolls for a few seconds. Owing to the short period of time for which the bagasse remains in the pressure zone between the rolls it is moreover necessary for the water separation mills to be arranged in series. The water separation mills, which require and the higher power stream turbines and reduction gears to drive them at low speed necessitate, a high capital outlay. In addition, due to their liability to breakdown, they demand continuous maintenance. The high pressures applied for extracting moisture cause rapid wear of the rolls.

In order to reduce the number of water separation mills disposed downstream of the diffuser it has already been proposed to effect partial extraction of water from the sugar cane (bagasse) at the end of the diffuser, that is to say upstream of its outlet end, for which purpose one or more pressure rolls is or are disposed at the end of the diffuser. These rolls operate at relatively low pressures and in comparison with the rolls of the water separation mills their operating life is longer. Effective partial extraction of water by means of rolls at the outlet end of the diffuser is, however, only possible provided the charging height of the bagasse layer is relatively low. A layer depth up to 1.5 meters is used in practice, but in order to increase throughput and therefore the operating efficiency of the diffuser, there has been a tendency to make the layer as deep as possible. Should the bagasse layer be too deep, the pressure rolls in the diffuser are no longer able to extract a sufficient proportion of moisture from the bagasse. From the foregoing it will be obvious that the relatively small depth of the bagasse layer required, if adequate partial extraction of water is to be achieved, conflicts with the fact that the economy of the method will be improved with increase in throughput, that is to say with an increase in depth of the bagasse layer.

Another disadvantage from excessive layer depth in the region of the pressure rolls arises from the fact that the sugar concentration of the extraction liquid adhering to the bagasse or percolating through the latter is already equal to the very low sugar concentration of the bagasse at the outlet end of the diffusion trough even when it is still a considerable distance from the bottom of the diffuser. As soon as the bagasse, or treated sugar cane, has the same sugar concentration as the extraction liquid adhering to it or percolating through it, due to the absence of any concentration drop between the bagasse and the extraction liquid there will be no further extraction of sugar for the remainder of the downward movement of the extraction liquid.

The underlying aim of the invention is to obviate the disadvantages of conventional extraction methods and apparatus and to develop a method and apparatus with the aid of which it is possible to achieve a reduction both in the moisture content and the residual sugar content of the sugar cane-bagasse before it enters the water separation mills.

The object of the invention is therefore to relieve the water separation mills following the diffuser and at the same time to achieve an additional yield of sugar through effective after-diffusion without spraying with extraction liquor outside the extraction zone.

This aim is achieved, according to the envention, by subjecting the sugar cane-bagasse, on leaving the extraction zone, and before entering the water separation mills, to after-diffusion and preliminary pressing in a pressing device, the rate of travel of which is higher than that in the extraction zone. In consequence of the sudden increase in speed, the depth of the bagasse layer is of necessity reduced, so that with a small layer depth and with the application of low extraction pressure, not only is the moisture content of the bagasse reduced but effective after-diffusion is achieved, while the extraction liquor adhering to or percolating through the bagasse never equals the sugar concentration of the latter, because of the smaller layer depth.

Experiments have shown that with the layer depth, which is reduced in consequence of the increase in speed, pressing times of a few minutes and low extraction pressure of only a few atmospheres are sufficient both to reduce the moisture content of the bagasse and to achieve a favourable time-dependent after-diffusion without supplying fresh extraction liquid. In addition, on passing from the extraction zone where there is a lower rate of travel to the pressure zone according to the invention where the rate of travel is increased there is a restratification of the bagasse, which effects an improvement in sugar extraction by breaking up the boundary layers at the individual particles of the bagasse. A further improvement of after-diffusion and preliminary pressing can be achieved according to the invention by disposing, in the region of the transfer from diffuser to pressing zone, a stripping and throwing roller which breaks up the more or less compact layer of bagasse and feeds it, uniformly restratified, to a device in which the aforesaid after-diffusion and preliminary pressing take place at low pressure and with a low layer depth.

In order to achieve effective preliminary pressing and after-diffusion of the bagasse in the press, at least one, but preferably a plurality of pressure rolls are mounted in a swinging or other adjustable frame, the frame, in order to increase the extraction pressure, being under control of a vertical ram. At the end of the press another stripping and throwing roller may be disposed for the purpose of restratifying the bagasse and throwing it on to a conveyor or chute delivering to a water separation mill.

At the outlet end of the diffuser, that is to say upstream of the stripping and throwing roller, there is provided, according to the invention, either a partition roller or a slide shoe under control of a vertical operating ram. The partition roller and slide shoe not only serve to prevent extraction liquid from passing out at the outlet end of the diffuser but also apply pressure in the diffuser to remove part of the extraction liquor in the bagasse layer.

Since the density of the layer of sugar cane-bagasse continuously increases in its path through the diffuser and since the solid particles suspended in the extraction liquor for example as the result of pH value fluctuations, increasingly reduce the permeability of the bagasse layer at it approaches the outlet end of the diffuser, it may happen that in particular the extraction liquor at the outlet end of the diffuser will no longer penetrate into the bagasse layer but will tend to remain on the surface. To overcome this, according to the invention, there is disposed in the diffuser, upstream of the spray distributors fed from the water separation mills, in relation to the direction of transport, at least one stripping or tearing roller provided with barbs, discs, grooves, or the like, the purpose of which is to loose the upper region of the bagasse layer to such an extent that the extraction liquid can more readily penetrate the bagasse layer.

The invention is illustrated in the accompanying drawings which show examples of construction of an extraction device according to the invention. In the drawings:

FIGURE 3 is a part elevation of a diffuser followed by a press device, and FIGURE 4 is an elevation partly in section of a diffuser constructed in accordance with a further embodiment of the invention.

Figure 1:
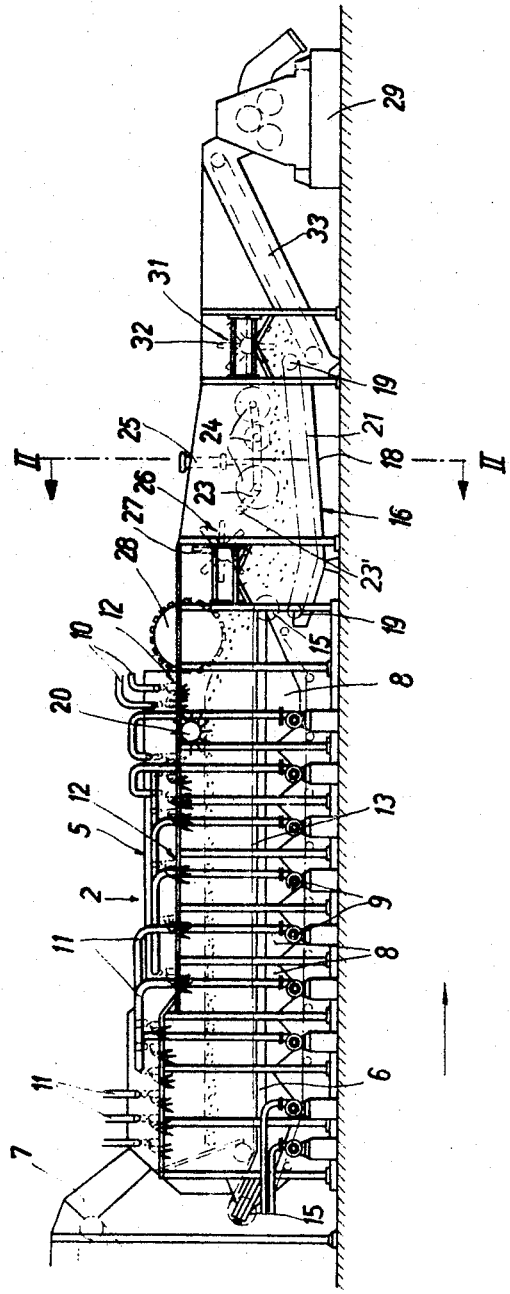
FIGURE 1 is a side elevation of a diffuser according to the invention.
Figure 2:
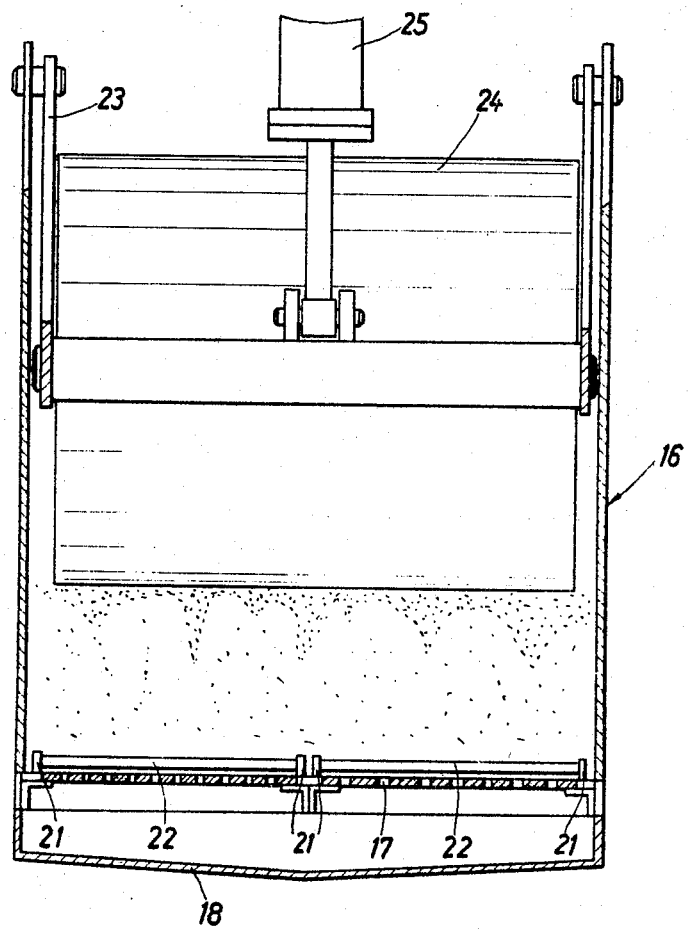
FIGURE 2 is a vertical section on an enlarged scale, on the line II—II of FIGURE 1, and showing the press device.

Referring to FIG. 1 the diffuser indicated generally at 2, comprises an open top chamber 5, the bottom of which is constituted by a fixed screen 6, the screen 6, which may consist of mesh material extending upwardly at an angle at the inlet or charging end and receiving sugar cane to be processed from a filling hopper 7. Beneath and extending lengthwise of the screen 6, there are disposed a series of tanks 8 which extend over the entire width of the diffuser being placed side by side to receive the extraction liquor which is discharged in the form of sprays from overhead jets 12, the liquor percolating through the layer of sugar cane as the latter is moved along the screen. Each tank 8 has associated with it a circulation pump 9 for continuously drawing off the extraction liquor as it collects in the tank and recirculating it through pipes 11 to the jets 12.

The jets 12 are distributed over the entire length of the diffuser and, referred to the direction of transport, are situated upstream of the circulating pumps 9 or tanks 8 from which they are fed. An endless conveyor incorporating drag chains 13, indicated in FIG. 1 in dot and dash lines, slides over the screen 6, the chains being interconnected by slats or straight edges 14 (FIGURES 3 and 4). The drag chains 13 are supported by guide rollers 15 and in conjunction with the slats 14 advance the sugar cane bagasse at constant speed over the screen 6 to the outlet end of the diffuser, where the sugar cane residue or bagasse passes into a press 16. The press 16 likewise consists of a tank closed at the bottom by a screen 17, the liquor passing through the screen falling into a receiving tank 18. The bagasse entering the press 16 is transported by a conveyor including chains 21 and transverse slats 22 mounted on guide rollers 19. The conveyor 21, 22 has an independent drive and runs at a speed substantially higher than that of the drag chains 13 in the diffuser 5.

Above the conveyor device 21, 22, which is arranged at a level beneath the screen 9, are a plurality of pressure rolls 24. The rolls 24, which may be driven and may rotate at different peripheral speeds, are carried in a frame 23 mounted to swivel about a horizontal axis 23'. In order to increase the pressure applied to the bagasse beneath the rolls 24, the swivelling frame 23 is connected to a vertically operating ram 25.

Because of the higher rate of travel of the conveyor 21 in press 16, compared with that of the main conveyor 13 in the diffuser, on passing from the diffuser 5 to the press 16 the depth of the bagasse layer will be considerably reduced so that the pressure rolls 24 act on a relatively shallow bagasse layer and extract a correspondingly high amount of water. In order to intensify the restratification of the bagasse on passing from the diffuser 5 to the press 16, thereby advantageously assisting after-diffusion through the extraction liquor adhering to the bagasse particles, there is disposed at the end of the diffuser 5 a stripping and throwing roller 26, the arms 27 of which break up the compact cake of bagasse leaving the diffuser 5 and throw it, uniformly restratified, on to the conveyor 21, 22.

At the end of the diffuser 5 is a partition roller 28 the purpose of which is to restrict or prevent the extraction liquor from flowing out of the diffuser 5 and at the same time apply pressure to the bagasse. The spray distributors 10, fed with the extraction liquor from the water separation mill 29, are upstream of the partition roller 28 and are preceded by a driven break down (tearing) roll 20 equipped with barbs, discs, grooves, or the like. The break down roll 20 loosens the upper strata of the bagasse layer to such an extent that the extraction liquor from the spray distributors 10 which is laden with fine solid particles, can easily penetrate the layer. The breakdown roll 20 may also be disposed directly beneath the sprays 10 so that it is continuously washed by the outgoing extraction liquid.

At the end of the conveyor 21, 22 is a third stripping and throwing roller 31, the arms 32 of which pick up the bagasse from the conveyor 21, 22 and discharge it on to an elevator conveyor 33 discharging into a water separation mill 29.

In the embodiment illustrated in FIGURE 3, the transition between the screen 6 of the diffuser 5 and a rotating belt screen 35 mounted on rollers 36 and intermediate support rollers 34 (provided at least in the pressure region) is likewise in the form of a step. The screen belt 35 which moves at a speed in excess of the conveyor 13, is driven from one of the guide rollers 36. In this embodiment the roller at the discharge end of the screen 6, i.e., the outlet of the diffuser 5, is replaced, according to the invention, by a rockable slide shoe 38 whose position is regulated by a ram 30. The shoe 38 effects an equalisation of the bagasse layer as well as applying pressure to extract liquid therefrom. Otherwise the embodiment illustrated in FIGURE 3 corresponds essentially to that illustrated in FIGURE 1.

The embodiment shown in FIGURE 4 corresponds substantially to that of FIGURE 3, but the conveyor 34, 35, 36 is disposed in the end portion of the diffuser 5 and the upper side of the moving screen 35 is disposed in the same plane as that of the fixed screen 6 or of the conveyor 13 of the diffuser 5. In addition, in the FIGURE 4 embodiment, the pressure rolls 24 disposed in a swivelling frame 23 are replaced by a single pressure roll 37 driven by an electric motor 40, and mounted in a forked frame 39. In order to increase its effectiveness, the surface of the roll 37 has axially parallel ribs 41.

Guide plates 42 may be provided at each side of the conveyor 33 to prevent the bagasse thrown onto it from the roller 31 falling off at the sides.

Since in the press device of this invention both the pressure applied to the sugar cane bagasse and also, in dependence on the speed of conveying, the thickness, i.e. depth, of the sugar cane-bagasse layer can be adjusted as desired, by adjusting these factors to the consistency of the sugar cane-bagasse in question, optimum after-diffusion (extraction of residual sugar) and preliminary elimination of water in the press device are ensured. Experiments have shown that when the depth of the bagasse layer in the press is reduced to about 50% of the depth in the diffuser, there is an increase in the quantity of liquid extracted of about 20%, even at low pressures of a few atmospheres. At the same time it was found that the residual sugar content of the bagasse was considerably reduced. This not only results in increased economy in the process but also enables the number of water separation mills to be reduced.

The diffuser, including the diffusion trough, water separation mills and the sprinkling apparatus including the collection tanks and circulation of the extraction liquid on the counter-current principle, may be constructed in accordance with British specification No. 41,347/65—corresponding to U.S. Ser. No. 513,691.

What is claimed is:

1. Method of reducing the moisture and residual sugar content of sugar cane which comprises passing the sugar cane through a diffuser at a given rate of speed in a given direction, washing the sugar cane in an extraction zone of the diffuser with a spray of liquid conducted, from an accumulation thereof beneath the extraction zone, for a given distance in a direction counter to the direction in which the sugar cane is being passed through the extraction zone of the diffuser so as to extract sugar content from the sugar cane, and passing the sugar cane from which the sugar has been extracted through a preliminary pressure zone at a speed greater than said given rate of speed and subjecting it therein to further diffusion and compression prior to passing it for subsequent treatment through a liquid separating mill.

2. A diffuser apparatus for treatment of sugar cane and like material for the continuous extraction of sugar therefrom, said apparatus comprising:
   (A) a diffusion trough having
      (1) a perforated bed to support a layer of material to be treated thereon,
      (2) an inlet end,
      (3) a discharge end,
      (4) means for feeding material to be treated on to the bed at its inlet end to form a layer thereon,
      (5) means for conveying the layer of material on the bed from the inlet to the discharge end.
   (B) means for circulating liquid through the material in transit on the bed including
      (1) spray dischrage means extending lengthwise of the trough,
      (2) means for collecting the liquor after passage through the bed and recirculating it on the countercurrent principle;
   (C) a compression chamber at the discharge end of the diffusion trough for subjecting the material to a preliminary compression stage, said chamber having
      (1) conveyor means for advancing the material through the chamber,
      (2) roller means for applying pressure to the bed of material when on the conveyor;
   (D) means for transferring material from the diffusion trough to the compression chamber comprising
      (1) a partition roller located at the discharge end of the diffusion trough,
      (2) shredding means for breaking down the surface of the layer of material prior to passage through the compression chamber;
   (E) means for driving the conveyor means in the diffusion trough and compression chamber so arranged that the rate of travel of material through the latter exceeds that in passage through the trough;
   (F) a liquid separation mill through which the material is finally passed.

3. Apparatus as claimed in claim 2 and comprising a diffusion trough having a partition roller extending across the width of the trough at its discharge end.

4. Apparatus according to claim 2 and comprising a compression chamber wherein the conveyor means includes a conveyor having an upper and lower run, the upper run being located at a level beneath that of the conveyor in the diffusion trough.

5. Apparatus as claimed in claim 2 in which connections are provided between the liquid separation mill and the spray discharge means whereby material passing through the diffusion trough is treated with extraction liquor from the mill.

6. Apparatus as claimed in claim 2 wherein said compression chamber has inlet and discharge ends and rotary shredding means at both of said ends.

7. Apparatus as claimed in claim 6 wherein the shredding means comprises rollers mounted to revolve about horizontal axes within said compression chamber and located at each end thereof, said rollers having radial arms.

8. Apparatus as claimed in claim 2 wherein said compression chamber, is located between the discharge trough and the liquid separation mill, said chamber having an endless conveyor, a series of pressure rolls located above the conveyor and frame means within which the rolls are mounted, said frame means being mounted for angular displacement about a horizontal axis and means for adjusting the angular position of the support frame.

9. Apparatus as claimed in claim 2 wherein a presser plate is disposed adjacent said discharge end of said diffusion trough and is adapted to control the depth of the material issuing from said diffusion trough.

10. Apparatus as claimed in claim 9 in which the presser plate comprises an arcuate shoe mounted for angular displacement about a horizontal axis, and ram means connected to said shoe for adjusting its position.

References Cited

UNITED STATES PATENTS

| | | | |
|---|---|---|---|
| 246,731 | 9/1881 | Davis | 100—118 X |
| 1,287,582 | 12/1918 | Durant | 100—118 X |
| 1,296,112 | 3/1919 | Peiler | 100—169 |
| 2,684,228 | 7/1954 | De Smet | 23—270 |

FOREIGN PATENTS

| | | |
|---|---|---|
| 218,522 | 11/1907 | Germany. |
| 565,928 | 4/1958 | Belgium. |
| 1,341,722 | 9/1963 | France. |
| 1,378,132 | 10/1964 | France. |

MORRIS O. WOLK, Primary Examiner

D. G. CONLIN, Assistant Examiner

U.S. Cl. X.R.

23—270; 127—3, 43, 45